United States Patent
Hung

(10) Patent No.: US 11,090,137 B2
(45) Date of Patent: Aug. 17, 2021

(54) ORTHODONTIC CORRECTION DEVICE

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 273 days.

(21) Appl. No.: 16/216,888

(22) Filed: Dec. 11, 2018

(65) Prior Publication Data

US 2019/0175305 A1   Jun. 13, 2019

Related U.S. Application Data

(60) Provisional application No. 62/597,602, filed on Dec. 12, 2017.

(51) Int. Cl.
| | | |
|---|---|---|
| *A61C 7/08* | (2006.01) | |
| *A61C 7/30* | (2006.01) | |
| *A61C 7/28* | (2006.01) | |
| *A61C 7/14* | (2006.01) | |

(52) U.S. Cl.
CPC ............. *A61C 7/08* (2013.01); *A61C 7/146* (2013.01); *A61C 7/303* (2013.01); *A61C 7/145* (2013.01); *A61C 7/282* (2013.01)

(58) Field of Classification Search
CPC .... A61C 7/08; A61C 7/14; A61C 7/22; A61C 7/146; A61C 7/303; A61C 7/145; A61C 7/282; C21B 11/00; C21B 11/02; C21B 13/02; F27B 1/02; F27B 1/16; F27B 1/20
USPC .......................................................... 433/6
See application file for complete search history.

(56) References Cited

U.S. PATENT DOCUMENTS

| | | | |
|---|---|---|---|
| 3,092,907 A | 6/1963 | Traiger | |
| 2003/0190575 A1 | 10/2003 | Hilliard | |
| 2011/0269092 A1 | 11/2011 | Kuo et al. | |
| 2013/0230819 A1 | 9/2013 | Arruda | |
| 2014/0363779 A1 | 12/2014 | Kopelman | |
| 2015/0216627 A1* | 8/2015 | Kopelman | A61C 7/08 433/6 |
| 2016/0074137 A1* | 3/2016 | Kuo | A61C 7/002 700/119 |

(Continued)

FOREIGN PATENT DOCUMENTS

| | | |
|---|---|---|
| CN | 106029001 A | 10/2016 |
| EP | 3028664 A2 | 6/2016 |

(Continued)

OTHER PUBLICATIONS

European Patent Office, Search Report, Patent Application No. 18212001.4, dated Mar. 29, 2019, Europe.

(Continued)

*Primary Examiner* — Nicholas D Lucchesi
*Assistant Examiner* — Mirayda A Aponte

(57) ABSTRACT

An orthodontic correction device is provided, including a shell having a number of teeth receiving cavities configured to receive teeth of a dental arch of a patient. A first elastic member holding feature is formed on one side of the shell and corresponds to an undercut region of a tooth of the dental arch. A first orthodontic elastic member is coupled to the first elastic member holding feature and extends to the interior of the shell to engage with the undercut region of the tooth, thereby enhancing the retention of the orthodontic correction device on the dental arch.

10 Claims, 10 Drawing Sheets

(56) References Cited

U.S. PATENT DOCUMENTS

2017/0007371 A1    1/2017  Robichaud

FOREIGN PATENT DOCUMENTS

| JP | 2017-505181 A | 2/2017 | | |
|---|---|---|---|---|
| TW | 201637625 A | 11/2016 | | |
| WO | WO-2017007964 A1 | * | 1/2017 | .............. A61C 7/08 |

OTHER PUBLICATIONS

Japan Patent Office, Office Action, Patent Application Serial No. 2018-232168, dated Mar. 3, 2020, Japan.
Korea Patent Office, Office Action, Patent Application Serial No. 10-2018-0159851, dated Mar. 6, 2020, Korea.

* cited by examiner

ORTHODONTIC CORRECTION DEVICE

CROSS REFERENCE TO RELATED APPLICATIONS

The present application claims priority of U.S. Provisional Patent Application No. 62/597,602, filed Dec. 12, 2017, the entirety of which is incorporated by reference herein.

BACKGROUND OF THE INVENTION

Field of the Invention

The present application relates to an orthodontic correction technology; and in particular to a removable orthodontic correction device.

Description of the Related Art

Misaligned teeth can adversely affect a person's dental aesthetics, functions, and health. The goal of orthodontic correction is to bring the teeth into proper alignment by using appliances which exert mechanical forces to move the teeth to positions or orientations where the dental functions and aesthetics are improved.

Conventional aligners are elastic repositioning appliances that provide the function of repositioning teeth. Aligners are typically used in a series of successive shells for orthodontic treatment. Each shell is shaped to conform to the target correction positions of teeth for that stage. When initially worn, the shell of an aligner is deformed to accommodate misaligned teeth and exert elastic forces on such teeth as it tries to return to its original shape.

Aligners may have protrusions formed in the wall of the shell, sized and located to contact interdental areas of the patient's teeth, often near the gingival margin, when the aligner is properly installed. Such placement of protrusions provides additional friction in dental regions, with contact in the interdental areas. Alternatively, the protrusions may be a continuous protrusion contacting more than one tooth along the gingival margin and the interdental areas to assist in holding the aligner in place.

Each elastic aligner shell moves teeth by a small increment, and prior art shell protrusions, while providing improved retention, is difficult to remove without causing pain to the patient. It is desirable to provide a patient removable orthodontic correction device with shells allowing the teeth to move a distance that is an aggregate of multiple small increments, having a means of retention that allows easy removal, and providing a rigid anchorage structure for orthodontic elastics acting on teeth.

BRIEF SUMMARY OF THE INVENTION

In view of the aforementioned problems, an object of the invention is to provide a patient removable orthodontic correction device having improved retention on the dental arch with the advantage of being easily removable without causing discomfort to the patient.

In some embodiments, an orthodontic correction device is provided. The orthodontic correction device includes a shell having a number of teeth receiving cavities configured to receive teeth of a dental arch of a patient. A first elastic member holding feature is formed on one side of the shell and corresponds to an undercut region of a tooth of the dental arch. A first orthodontic elastic member is coupled to the first elastic member holding feature and extends to the interior of the shell to engage with the undercut region of the tooth, thereby enhancing the retention of the orthodontic correction device on the dental arch.

In some embodiments, the first elastic member holding feature includes a center support member and a pair of notches symmetrically disposed on opposite sides of the center support member. The first orthodontic elastic member is coupled to the first elastic member holding feature by surrounding the center support member and engaging with the notches.

In some embodiments, each of the notches is L-shaped and includes a long portion and a short portion perpendicular to the long portion. The long portion is configured to allow the first orthodontic elastic member to enter the notch, and the short portion is configured to hold the first orthodontic elastic member in the notch.

In some embodiments, the orthodontic correction device includes a number of first orthodontic elastic members. Each of the notches is F-shaped and includes a long portion and two short portions perpendicular to the long portion. The long portion is configured to allow the first orthodontic elastic members to enter the notch, and the short portions are configured to hold the first orthodontic elastic members in the notch.

In some embodiments, when the shell is worn on the dental arch, a teeth receiving cavity of the shell that corresponds to the first elastic member holding feature has a shape providing a space to allow the first orthodontic elastic member to fit in the space and engage with the undercut region of the tooth.

In some embodiments, the teeth receiving cavities include at least one first teeth receiving cavity and a number of second teeth receiving cavities. The first teeth receiving cavity is configured to receive at least one first tooth of the dental arch that requires correction. The second teeth receiving cavities are configured to receive a number of second teeth of the dental arch that do not require correction. The first teeth receiving cavity has a shape allowing the first tooth to move to its target correction position, and the second teeth receiving cavities has shapes fitting the second teeth.

In some embodiments, the orthodontic correction device further includes a second orthodontic elastic member. The shell further has an opening to allow the second orthodontic elastic member to pass through to enter the interior of the shell, thereby exerting an elastic corrective force on at least one first tooth of the dental arch that requires correction.

In some embodiments, the orthodontic correction device further includes a second orthodontic elastic member. A pair of openings is formed at the distal end of the shell to allow the second orthodontic elastic member to pass through and enter the interior of the shell, thereby exerting an elastic corrective force on at least one first tooth of the dental arch that requires correction.

In some embodiments, the openings are formed to correspond to the undercut region of the first tooth.

In some embodiments, the orthodontic correction device further includes a second orthodontic elastic member. A pair of openings is formed on the buccal side and the lingual side of the shell to allow the second orthodontic elastic member to pass through and enter the interior of the shell, thereby exerting an elastic corrective force on at least one first tooth of the dental arch that requires correction.

In some embodiments, the shell further forms a second elastic member holding feature corresponding to at least one first tooth of the dental arch that requires correction. The orthodontic correction device further includes a second orthodontic elastic member coupled to the second elastic member holding feature and extending to the interior of the shell to exert an elastic corrective force on the first tooth.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
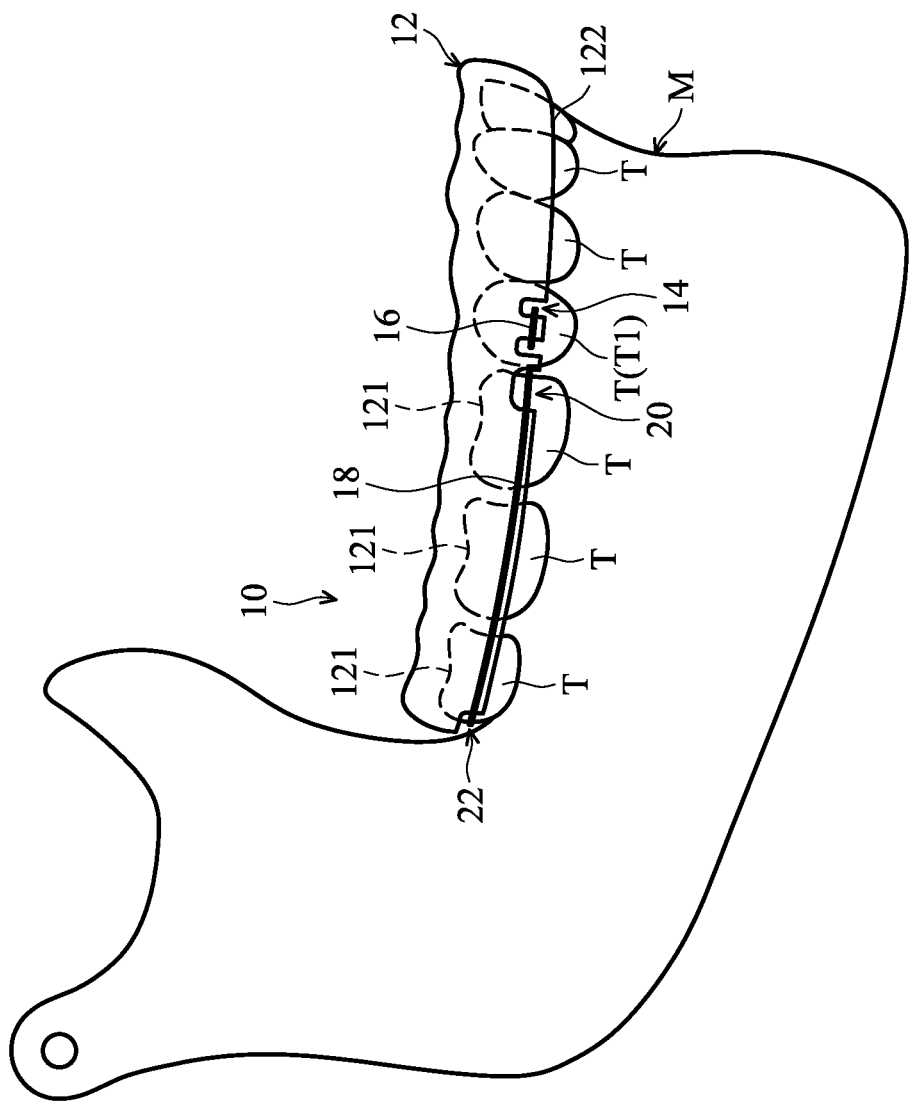
FIG. 1 is a schematic view showing an orthodontic correction device being worn on a dental arch of a patient, in accordance with some embodiments.

In order to illustrate the purposes, features, and advantages of the invention, the preferred embodiments and drawings of the invention are shown in detail as follows.

In the following detailed description, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

Generally, the present disclosure provides example embodiments relating to orthodontic correction devices that provide the function to solve various dental problems. In various embodiments, at least one elastic member holding feature is formed on the shell of the orthodontic correction device, and at least one orthodontic elastic member is coupled to the elastic member holding feature and extends to the interior of the shell to engage with an undercut region of at least one tooth of a dental arch of a patient, thereby improving the retention of the orthodontic correction device on the dental arch during orthodontic treatment. Some variations of the embodiments are described. Throughout the various views and illustrative embodiments, common elements use the same reference number.

Referring to FIG. 1, which is a schematic view showing an orthodontic correction device 10 being worn on a dental arch M of a patient, in accordance with some embodiments. The orthodontic correction device 10 can be used to provide a corrective force to urge several posterior teeth to move distally so as to create a space between the posterior teeth and anterior teeth for anterior teeth retraction (which will be further described later with reference to FIG. 4).

As shown in FIG. 1, the orthodontic correction device 10 includes a shell 12 that is worn on the mandibular dental arch M (for the sake of simplicity, it is also called the dental arch) of a patient during orthodontic treatment to urge posterior teeth of the dental arch M to move distally. In some other embodiments, the orthodontic correction device may also include a shell that is worn on the maxillary dental arch, or two shells that are worn on two dental arches of a patient during orthodontic treatment, according to actual requirements.

In some embodiments, the shell 12 is a retainer that can be removably worn on the dental arch M. The shell 12 is shaped to correspond to the shape of the dental arch M. A number of teeth receiving cavities 121 (as depicted by the dashed lines in FIG. 1) are formed on the inner surface of the shell 12 for receiving teeth T of the dental arch M. The interior of the shell 12 is defined by the teeth receiving cavities 121.

In the present embodiment, the shell 12 is not elastic, and the shell 12 does not provide the function of repositioning teeth T (in contrast to the conventional aligner). The shell 12 is rigid in order to serve as an anchorage for several orthodontic elastic members to exert elastic forces on teeth T during orthodontic treatment (which will be further described later). The shell 12 may be made of orthodontic resin or other materials suitable for use in oral applications.

It should be understood that the shell 12 can be easily separated from the dental arch M during orthodontic treatment, which adversely affects the performance of the orthodontic correction device 10. It is therefore desired to improve the retention of shell 12 on the dental arch M when the orthodontic correction device 10 is worn. In some embodiments, one or more elastic member holding features are formed on the shell 12, and one or more orthodontic elastic member are provided and coupled to the respective elastic member holding features so as to improve the retention of shell 12 on the dental arch M.

For example, as shown in FIG. 1, two elastic member holding features 14 are respectively formed on the left buccal side and right buccal side of the shell 12 (only one elastic member holding feature 14 is depicted due to limited viewing angle). However, the number and location of the elastic member holding features 14 can vary in different embodiments. For example, the orthodontic correction device 10 may further include two elastic member holding features 14 respectively formed on the left and right lingual sides of the shell 12 in some alternative embodiments.

When the shell 12 is worn on the dental arch M, each of the elastic member holding features 14 is located to correspond to an undercut region of a tooth (e.g., a first premolar T1 of the dental arch M shown in FIG. 1; however, each of the elastic member holding features 14 may be located to correspond to an undercut region of another tooth in different embodiments). As used herein, the term "undercut region" refers to a region of a tooth defined by the connecting line of the most prominent points of the tooth (e.g., the dotted region shown in FIG. 3). In some embodiments, the elastic member holding features 14 are formed by cutting into the gingival edge 122 (i.e., the edge near the gingival portions of teeth T) of the buccal side of the shell 12.

Figure 2A:
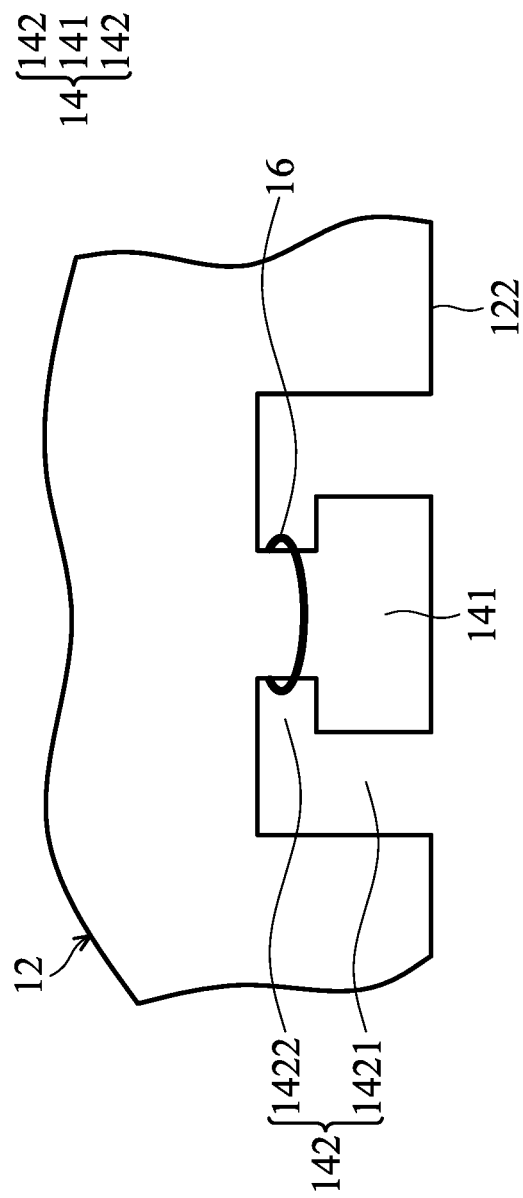
FIG. 2A is a partial enlarged view showing the coupling of an elastic member holding feature and an orthodontic elastic member, in accordance with some embodiments.
Figure 2B:
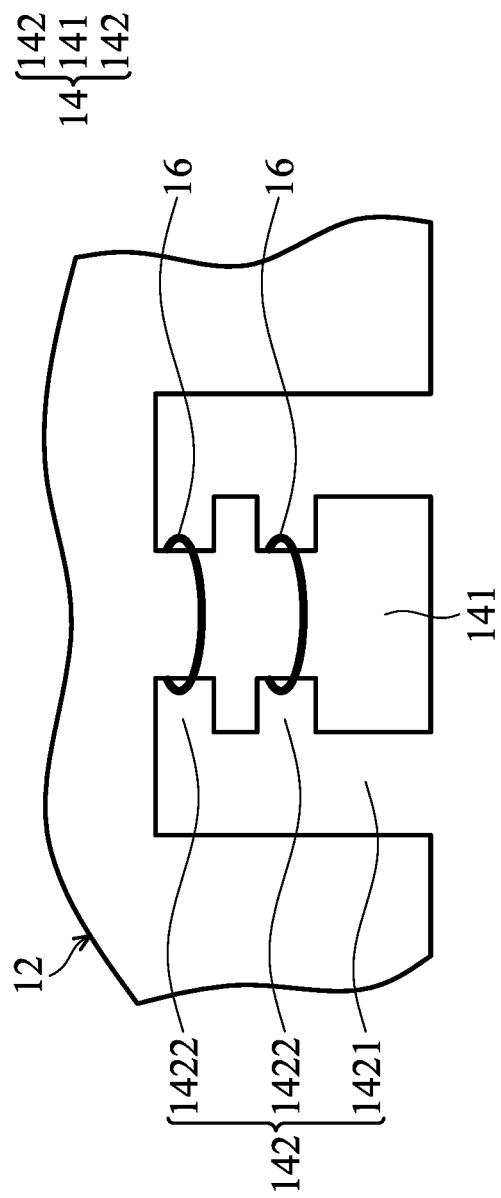
FIG. 2B is a partial enlarged view showing the coupling of an elastic member holding feature and multiple orthodontic elastic members, in accordance with some embodiments.
Figure 4:
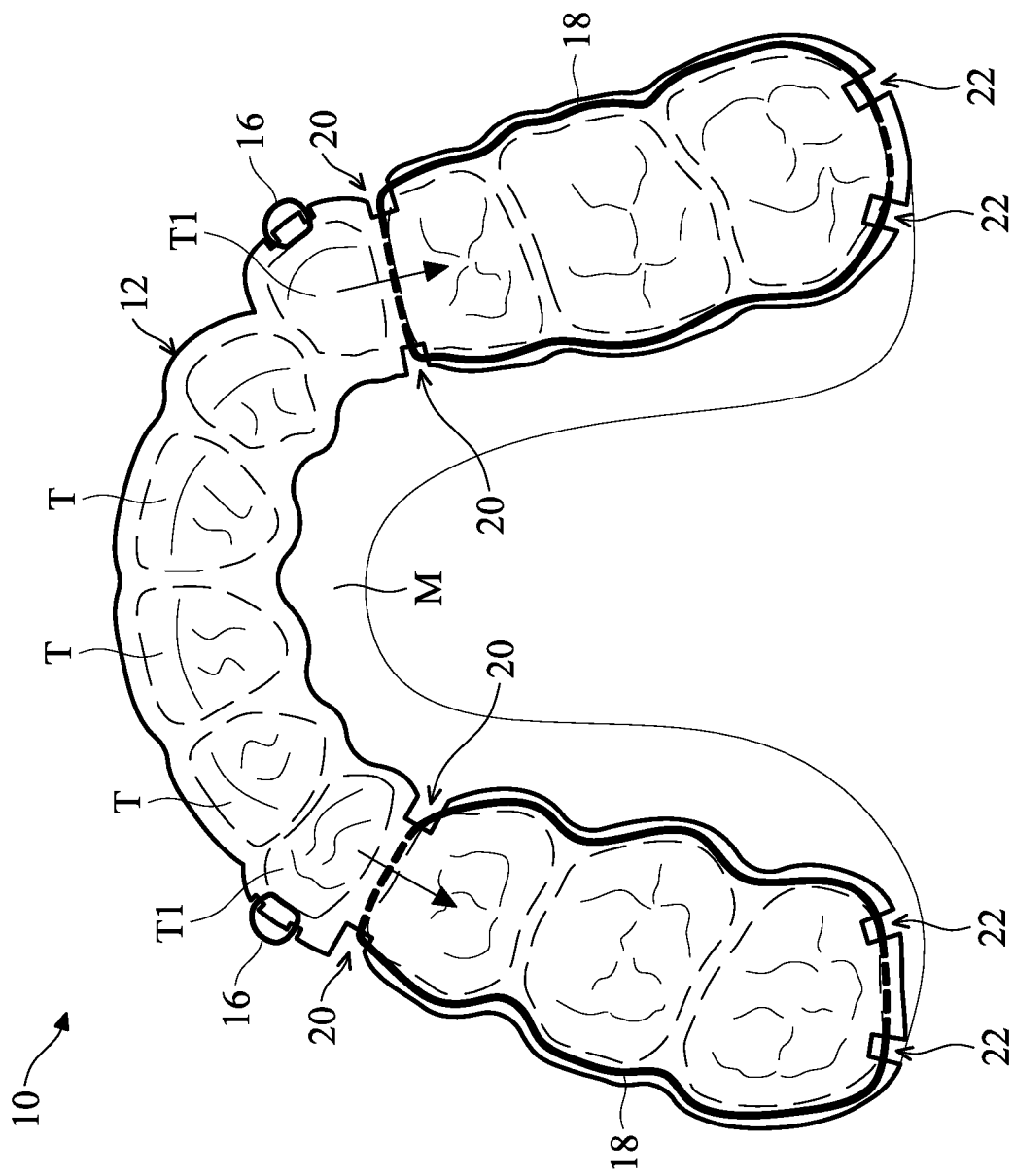
FIG. 4 is a schematic view showing an orthodontic elastic member in FIG. 1 extending to the interior of the shell to exert an elastic corrective force to urge posterior teeth to move distally.

As shown in FIGS. 1 and 4, the orthodontic correction device 10 also includes two orthodontic elastic members 16 respectively coupled to the two elastic member holding features 14 formed on the shell 12. As shown in FIGS. 2A and 2B, the formed elastic member holding feature 14 includes a center support member 141 and a pair of notches 142 symmetrically disposed on opposite sides of the center support member 141 in some embodiments. The orthodontic elastic member 16 (e.g., O-rings) can be coupled to the elastic member holding feature 14 by surrounding the center support member 141 and engaging with the notches 142. The notch 142 may include a long portion 1421 and a short portion 1422 perpendicular to the long portion 1421 (i.e., the notch 142 is L-shaped) in some examples (FIG. 2A). The long portion 1421 is configured to allow the orthodontic elastic member 16 to enter the notch 142, and the short portion 1422 is configured to hold the orthodontic elastic member 16 in the notch 142.

In some alternative examples, each of the elastic member holding features 14 may be configured to dispose and hold multiple orthodontic elastic members 16. For example, as shown in FIG. 2B, the notch 142 includes a long portion 1421 and two short portions 1422 perpendicular to the long portion 1421 (i.e., the notch 142 is F-shaped). The long portion 1421 is configured to allow orthodontic elastic members 16 to enter the notch 142, and the short portions 1422 are configured to hold the orthodontic elastic members 16 in the notch 142.

Figure 3:
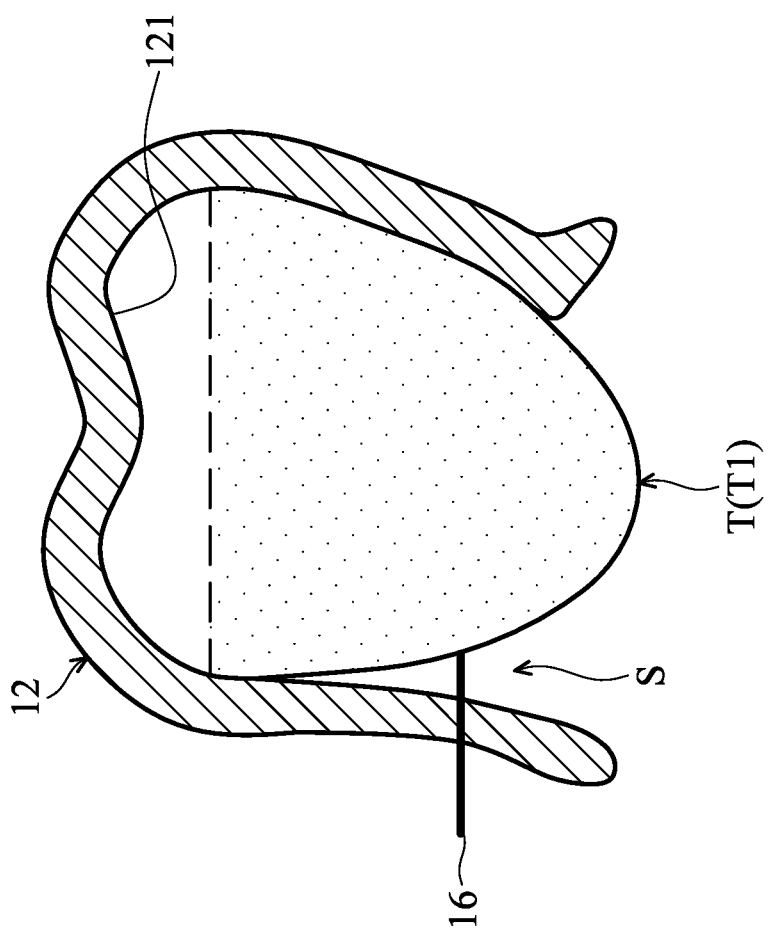
FIG. 3 is a cross-sectional view showing the orthodontic elastic member in FIG. 1 engaging with an undercut region of a tooth.

In addition, the orthodontic elastic members 16 further extend to the interior of the shell 12 to engage with the undercut regions of the respective teeth. For example, as shown in FIGS. 1 and 3, when the shell 12 is worn, the teeth receiving cavity 121 that corresponds to the elastic member holding feature 14 has a shape providing a space S (between the wall of the teeth receiving cavity 121 and the respective tooth T) to allow the respective orthodontic elastic member 16 to fit in the space S and engage with the undercut region of the respective tooth T (e.g., the first premolar T1). Accordingly, the retention of the orthodontic correction device 10 on the dental arch M during orthodontic treatment is improved.

The orthodontic correction device 10 further includes a number of orthodontic elastic members 18 (e.g., rubber bands) configured to provide a corrective force to urge posterior teeth to move distally so as to create a space between the posterior teeth (e.g., the second premolars, first molars, and second molars) and anterior teeth for anterior teeth retraction. It should be understood that the posterior teeth are separately retracted to create space for the retraction of anterior teeth. For example, the second molar and the first molar are separately retracted prior to the installation of the orthodontic correction device 10 for the retraction of the second premolar.

In some embodiments, as shown in FIGS. 1 and 4, referring to the left and right portions of the shell 12, a pair of openings 20 is formed on the buccal and lingual sides of each portion, located a small distance distally from the mesial edge of the second premolar. In addition, two pairs of openings 22, 22 are respectively formed at two distal ends of the shell 12, located a small distance mesially from the distal edge of the second molar. In some embodiments, the openings 20 and 22 are formed (e.g., by cutting) on the gingival edge 122 of the shell 12 and correspond to the undercut region of the posterior teeth as shown in FIG. 1.

The openings 20 and 22 allow the two orthodontic elastic members 18 to pass through (for each orthodontic elastic member 18, it passes through a pair of openings 20 and a pair of openings 22) and enter the interior of the shell 12 (as depicted by the dashed lines in FIG. 4). Accordingly, when the orthodontic correction device 10 is worn, the orthodontic elastic members 18 exert an elastic corrective force on the second premolar to urge it to move distally toward the first and second molars (as indicated by the arrows in FIG. 4), while the shell 12 serves as an anchorage for the orthodontic elastic members 18 (i.e., the shell 12 does not provide the force to push teeth), during orthodontic treatment.

It should also be understood that the orthodontic elastic members 16 and 18 can be placed or mounted on the shell 12 prior to the installation of the orthodontic correction device 10 on the dental arch M. Since the orthodontic elastic members 16 and 18 are flexible and deformable, they do not interfere with the installation of the orthodontic correction device 10. The orthodontic elastic members 16 and 18 can also be replaced with other types of elastic members, such as orthodontic threads, power chains, or the like in different embodiments. The orthodontic elastic members 16 and 18 can have various sizes and tensions according to actual requirements.

Figure 11:
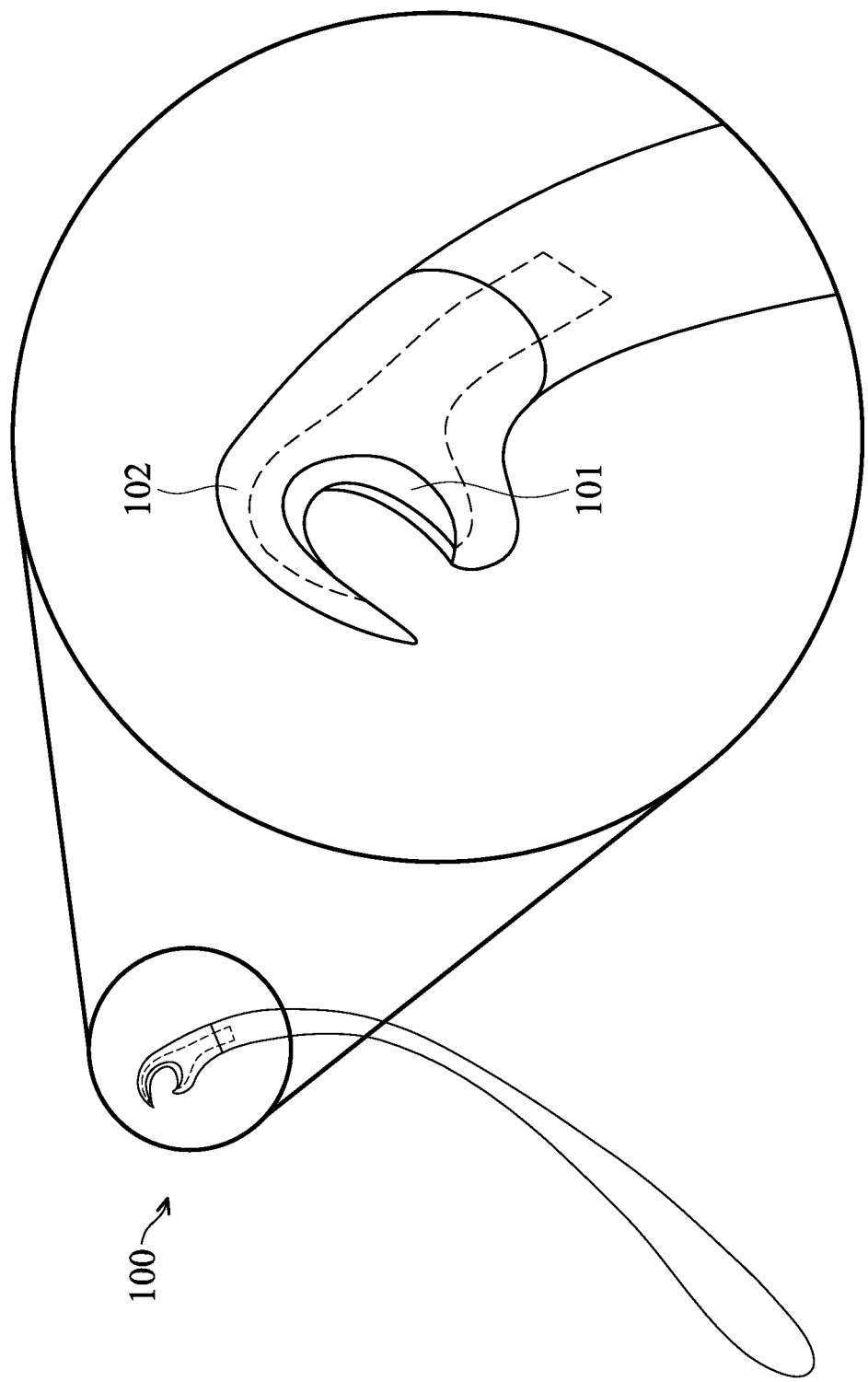
FIG. 11 is a schematic view of a cutting tool, in accordance with some embodiments.

After orthodontic treatment, the orthodontic correction device 10 can be removed from the dental arch M after cutting the orthodontic elastic members 16 and 18. Accordingly, it is easy to remove the orthodontic correction device without causing discomfort to the patient. In some embodiments, the patient or dentist uses a cutting tool to cut the orthodontic elastic members 16 and 18. FIG. 11 is a schematic view of a cutting tool 100 in accordance with some embodiments. The cutting tool 100 is an elongated structure including a blade 101 placed inside a hook-shaped end portion 102 of the cutting tool 100. The hook-shaped end portion 102 provides the function of preventing the blade 101 from cutting the hands. Other types of cutting tools can also be used.

Figure 5:
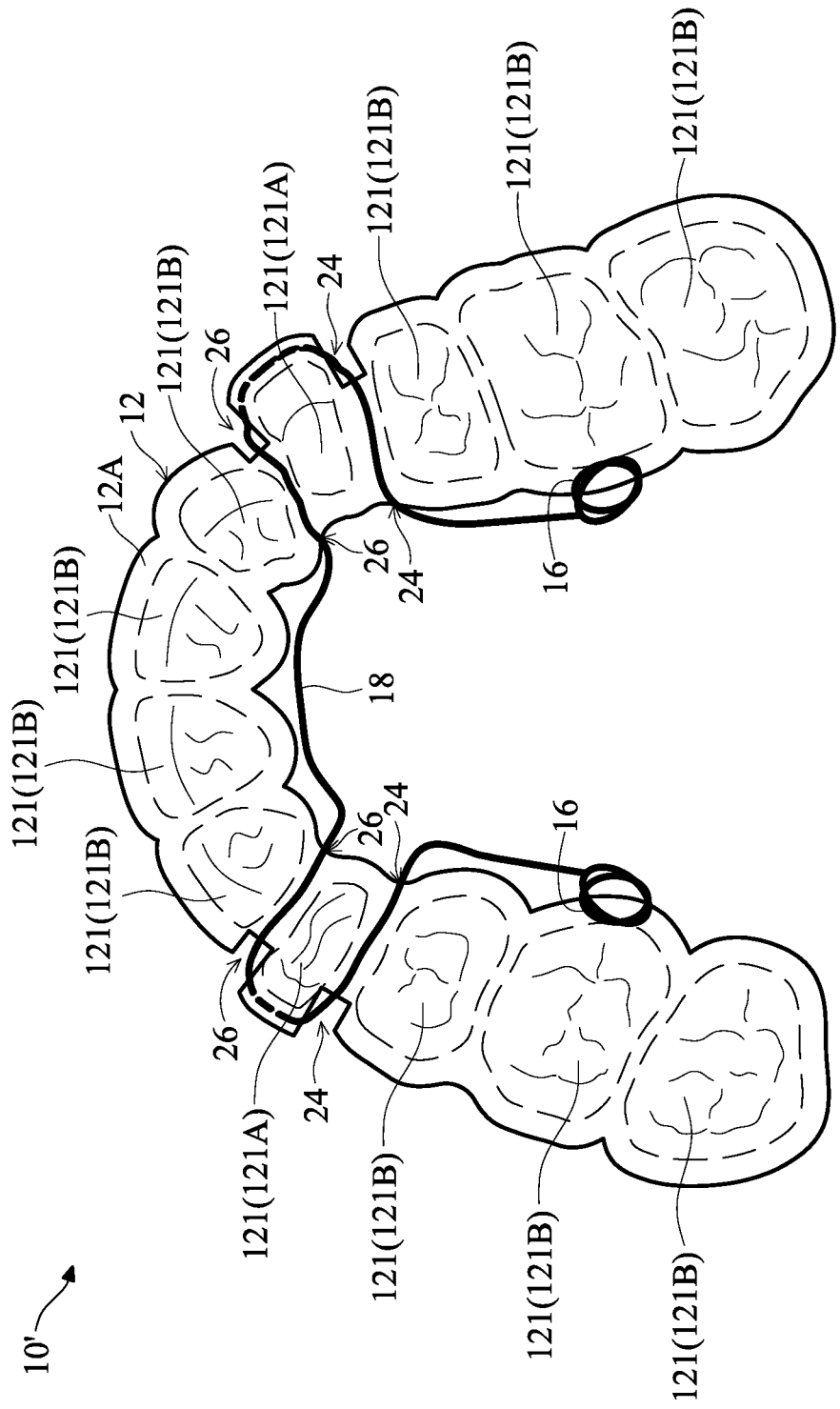
FIG. 5 is a schematic view showing an orthodontic correction device prior to being worn on a dental arch of a patient, in accordance with some embodiments.
Figure 6:
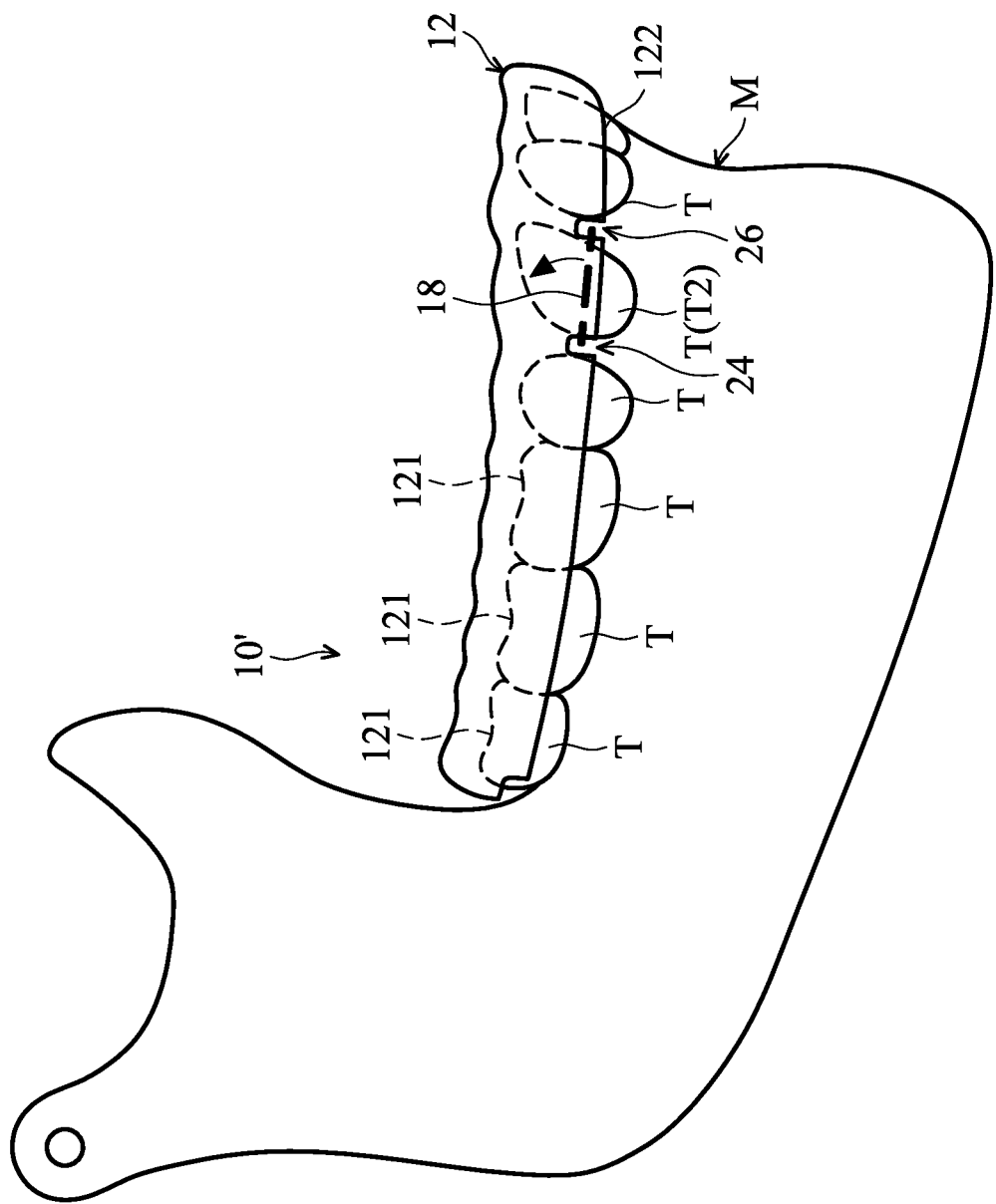
FIG. 6 is a schematic view showing the orthodontic correction device in FIG. 5 being worn on the dental arch of the patient, in accordance with some embodiments.

Next, refer to FIGS. 5 and 6. FIG. 5 is a schematic view showing another orthodontic correction device 10' prior to being worn on a dental arch M of a patient, in accordance with some embodiments. FIG. 6 is a schematic view showing the orthodontic correction device 10' in FIG. 5 being worn on the dental arch M of the patient, in accordance with some embodiments. The orthodontic correction device 10' can be used to provide a corrective force to urge one or more misaligned teeth to their envisioned or target correction positions.

As shown in FIGS. 5 and 6, the orthodontic correction device 10' includes a shell 12, two orthodontic elastic members 16 (e.g., O-rings), and one orthodontic elastic member 18 (e.g., a rubber band). Common elements are labeled with the same reference numerals in the embodiments described above, and the same details are not repeated.

Teeth receiving cavities 121 are formed on an inner surface 12A of the shell 12 for receiving teeth T of the dental arch M. Although not clearly shown, two elastic member holding features (e.g., the elastic member holding features 14 shown in FIG. 2A and/or FIG. 2B) are formed on the shell 12, for example, they are respectively formed on the left lingual side and right lingual side of the shell 12 for disposing and holding the two orthodontic elastic members 16 by the above method (FIGS. 2A and 2B). When the orthodontic correction device 10' is worn, each of the orthodontic elastic members 16 extends to the interior of the shell 12 to engage with an undercut region of a tooth T (e.g., a first molar; however, each of the orthodontic elastic members 16 may correspond to an undercut region of other tooth in different embodiments). Accordingly, the retention of the orthodontic correction device 10' on the dental arch M during orthodontic treatment is improved.

In this embodiment, two canine teeth T2 of the patient are the misaligned teeth (first teeth) that require correction. The canine teeth T2 are respectively tilted toward the buccal side (flare out, see FIGS. 6 and 7). The teeth receiving cavities 121 of the shell 12 include two first teeth receiving cavities 121A for receiving the two first teeth T2 that require correction and a number of second teeth receiving cavities 121B for receiving other teeth T (second teeth) that do not require correction. Each of the first teeth receiving cavity 121A has a shape defining the respective first tooth T2 in its target correction position (which will be further described later). The second teeth receiving cavities 121B have shapes fitting the second teeth T so that shell 12 serves as an anchorage for the orthodontic elastic member 18 to exert elastic corrective forces on the first teeth T during orthodontic treatment.

In some embodiments, as shown in FIG. 5, referring to the left and right side portions of the shell 12, two pairs of openings (or notches) 24, 26 are formed on the buccal side and lingual side of each portion near the respective first teeth receiving cavity 121A. The two pairs of openings (or notches) 24, 26 allow the orthodontic elastic member 18 to pass through and enter the interior the shell 12 (while both ends of the orthodontic elastic member 18 are fixedly coupled to two first elastic member holding features).

In particular, two sections of the orthodontic elastic member 18 corresponding to the two first teeth receiving cavities 121A are placed outside those cavities (see FIG. 5) prior to the installation of the orthodontic correction device 10' on the dental arch M. Upon installation of the orthodontic correction device 10', the sections of the orthodontic elastic member 18 corresponding to the first teeth receiving cavities 121A each is brought inside that cavity to contact the respective misaligned first tooth T2 (see FIG. 6), thereby exerting an elastic corrective force on the first tooth T2 to upright it (as indicated by the arrow in FIG. 6).

Figure 7:
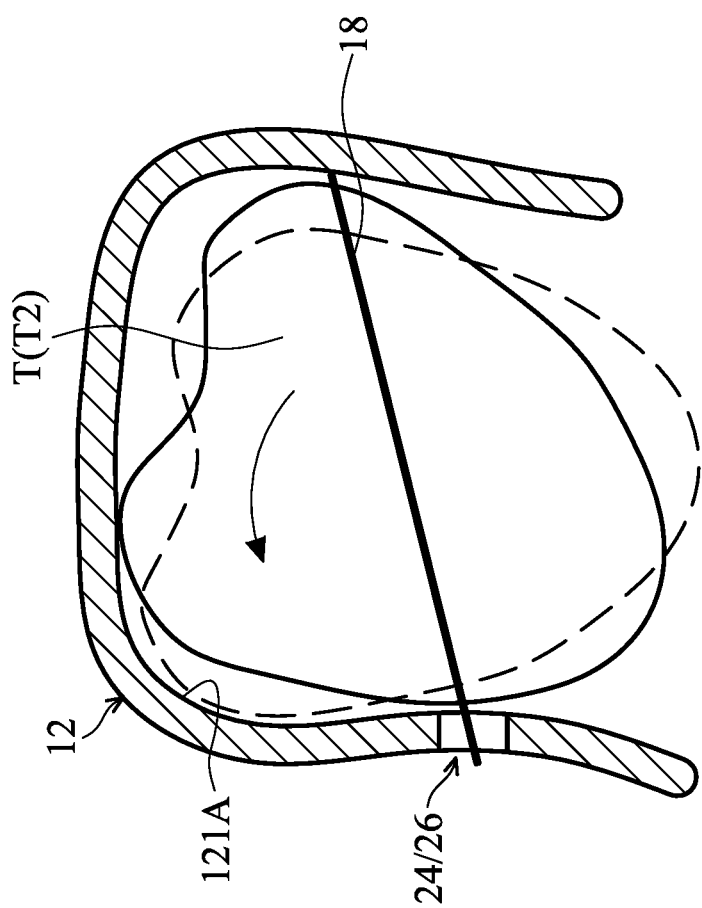
FIG. 7 is a cross-sectional view showing that the shape of the teeth receiving cavity determines the target correction position of the corrected tooth.

In some embodiments, as shown in FIG. 7, the first teeth receiving cavity 121A is shaped to allow the respective first tooth T2 to move to its target correction position. Accordingly, the shape of the first teeth receiving cavity 121A determines the target correction position of the corrected first tooth T2 (as depicted by the dashed lines in FIG. 7). The amount of tooth movement to reach the target position can be an aggregate of multiple small increments achieved only by using multiple prior art aligners.

The orthodontic correction device 10' can also be removed from the dental arch M after cutting the orthodontic elastic members 16 and 18 with a cutting tool (e.g., the cutting tool 100 shown in FIG. 11) after orthodontic treatment.

Figure 8:
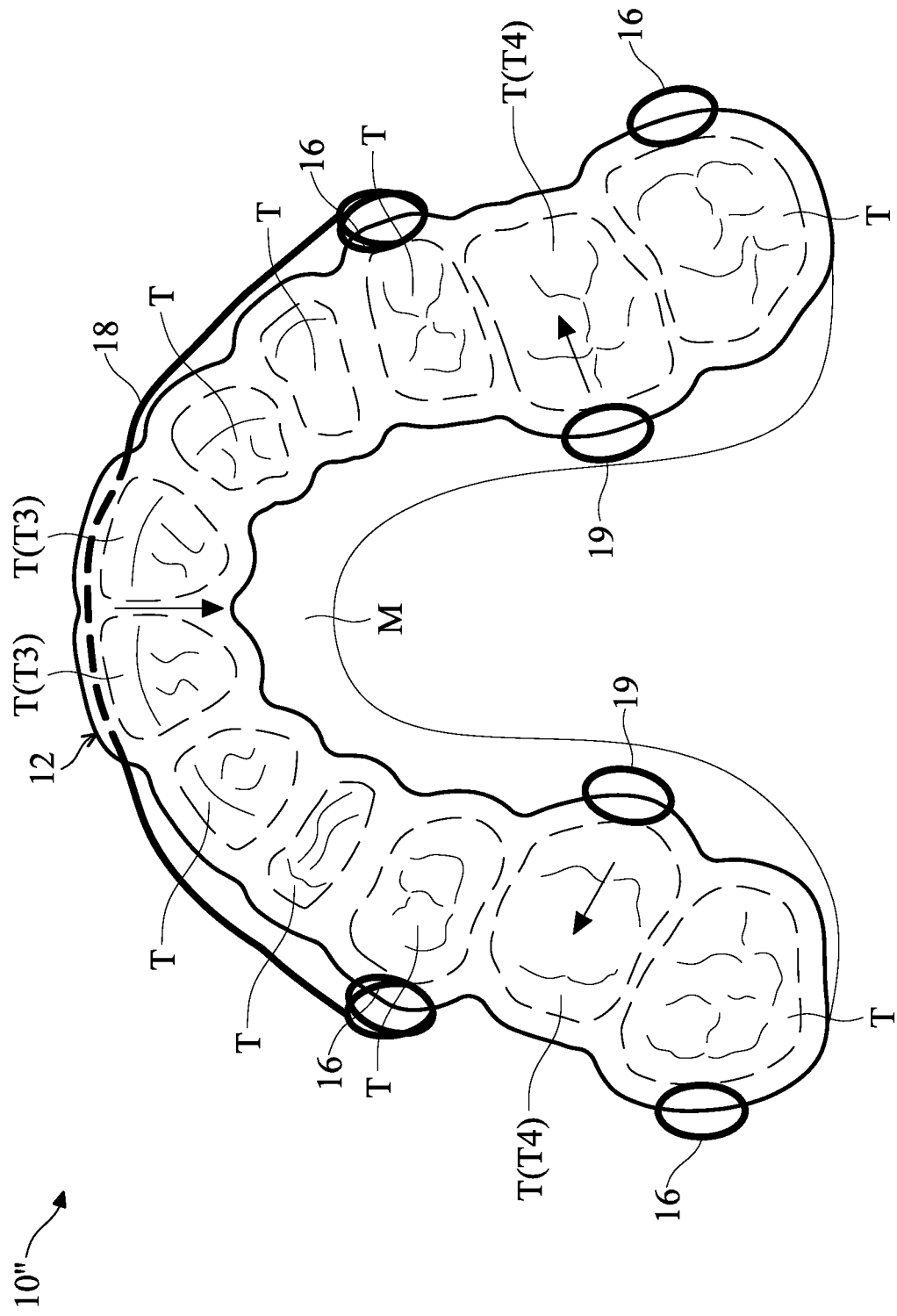
FIG. 8 is a schematic view showing an orthodontic correction device being worn on a dental arch of a patient, in accordance with some embodiments.

Next, refer to FIG. 8, which is a schematic view showing yet another orthodontic correction device 10" being worn on a dental arch of a patient, in accordance with some embodiments. The orthodontic correction device 10" can be used to provide a corrective force to urge protruding incisors backwards to correct the protrusion, and also to provide another corrective force to urge one or more misaligned teeth to their envisioned or target correction positions.

As shown in FIG. 8, the orthodontic correction device 10" includes a shell 12, four orthodontic elastic members 16 (e.g., O-rings), one orthodontic elastic member 18 (e.g., a rubber band), and two orthodontic elastic members 19 (e.g., O-rings). The shell 12, orthodontic elastic members 16, and orthodontic elastic member 18 are similar to the elements labeled with the same reference numerals in the embodiments described above, and the same details are not repeated.

Teeth receiving cavities 121 (see FIG. 10) are formed on the inner surface of the shell 12 for receiving teeth T of the dental arch M. Although not clearly shown, four elastic member holding features (e.g., the elastic member holding features 14 shown in FIG. 2A and/or FIG. 2B) are formed on the shell 12, for example, they are respectively formed on the left buccal side, left lingual side, right lingual side, and right buccal side of the shell 12 for disposing and holding the four orthodontic elastic members 16 by the above method (FIGS. 2A and 2B). When the orthodontic correction device 10" is worn, each of the orthodontic elastic members 16 extends to the interior of the shell 12 to engage with an undercut region of a tooth T. Accordingly, the retention of the orthodontic correction device 10" on the dental arch M during orthodontic treatment is improved.

Figure 9:
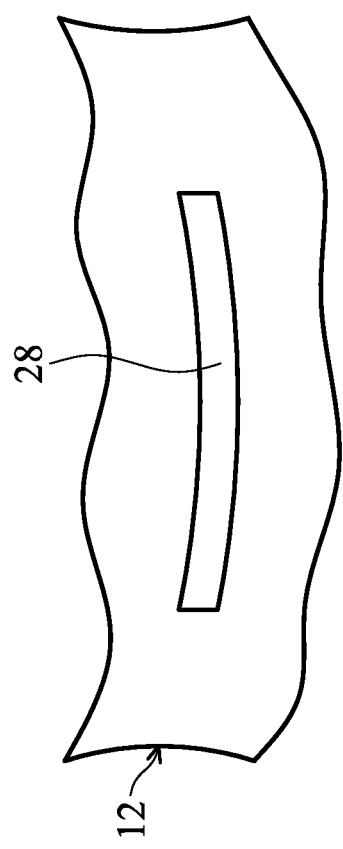
FIG. 9 is a schematic view showing an opening formed on a labial side of the shell in FIG. 8.

In the present embodiment, two incisors T3 of the patient are the misaligned teeth that require correction, being too protruding. To correct this, the orthodontic elastic member 18 is disposed on the shell 12 to exert an elastic corrective force to urge the protruding incisors T3 backwards to correct the protrusion. For example, as shown in FIGS. 8 and 9, the orthodontic elastic member 18 is disposed along a labial-buccal side of the shell 12 while both ends of the orthodontic elastic member 18 are fixedly coupled to two elastic member holding features. The shell 12 has an elongated opening 28 formed on a labial side of the shell 12 to allow the orthodontic elastic member 18 to pass through to enter the interior of the shell 12, thereby exerting an elastic corrective force to urge the protruding incisors T3 backwards (as indicated by the back arrow in FIG. 8) to correct the protrusion.

In addition, two first molars T4 of the patient are also the misaligned teeth that require correction, for example, they are respectively shifted toward the lingual side. To correct this, the orthodontic elastic members 19 are disposed on the shell 12 to exert elastic corrective forces to urge the first molars T4 to move to their target correction positions. For example, two elastic member holding features (not clearly shown) with the same structure as the elastic member holding features for holding the orthodontic elastic members 16 are formed on the shell 12 (for example, on the left lingual side and right lingual side of the shell 12) and correspond to the two first molars T4. Each of the orthodontic elastic members 19 is coupled to the respective elastic member holding feature and extends to the interior of the shell 12, thereby exerting an elastic corrective force on the respective first molar T4 to urge it to move (as indicated by the left and right arrows in FIG. 8).

Figure 10:
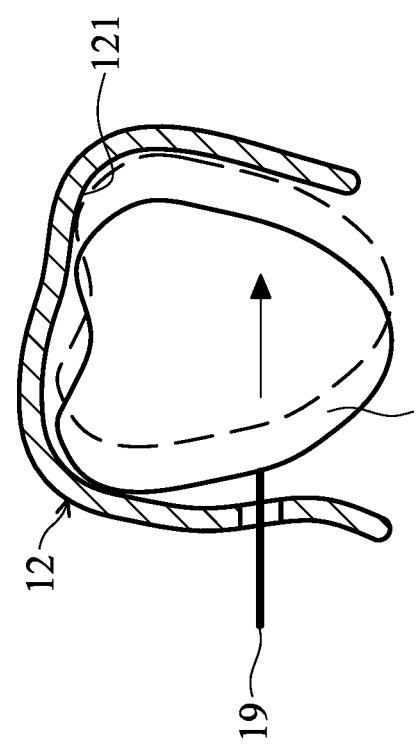
FIG. 10 is a cross-sectional view showing that the shape of the teeth receiving cavity determines the target correction position of the corrected tooth.

In some embodiments, as shown in FIG. 10, the teeth receiving cavity 121 corresponding to the misaligned first molar T4 is shaped to allow the first molar T4 to move to the target correction position. Accordingly, the shape of the first teeth receiving cavity 121 determines the target correction position of the corrected first molar T4 (as depicted by the dashed lines in FIG. 10).

The orthodontic correction device 10" can also be removed from the dental arch M after cutting the orthodontic elastic members 16, 18 and 19 with a cutting tool (e.g., the cutting tool 100 shown in FIG. 11) after orthodontic treatment.

As described above, the embodiments of the present disclosure provide removable orthodontic correction devices to solve various dental problems. In particular, removable orthodontic elastic members are disposed on the shell of the orthodontic correction device and engage with teeth located inside the shell so as to improve the retention of the device on the dental arch during orthodontic treatment. Furthermore, other removable orthodontic elastic members mounted on the shell can be used to provide corrective force to urge misaligned teeth to move to their envisioned or target correction positions. Since a single shell is used (in other words, there is no need to change the shell) with several orthodontic elastic members throughout the orthodontic treatment, the cost is reduced.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An orthodontic correction device, comprising:
a shell having a plurality of teeth receiving cavities configured to receive teeth of a dental arch of a patient, a first elastic member holding feature, and at least one opening, wherein the first elastic member holding feature is formed on one side of the shell and corresponds to an undercut region of a tooth of the dental arch, wherein the shell is rigid without elasticity;
a first orthodontic elastic member coupled to the first elastic member holding feature and extending to an interior of the shell to engage with the undercut region of the tooth to enhance the retention of the orthodontic correction device on the dental arch; and
a second orthodontic elastic member passing through at least one opening to enter the interior of the shell, thereby exerting an elastic corrective force on at least one first tooth of the dental arch that requires correction.

2. The orthodontic correction device as claimed in claim 1, wherein the first elastic member holding feature comprises a center support member and a pair of notches symmetrically disposed on opposite sides of the center support member, wherein the first orthodontic elastic member is coupled to the first elastic member holding feature by surrounding the center support member and engaging with the pair of notches.

3. The orthodontic correction device as claimed in claim 2, wherein each notch of the pair of notches is L-shaped, comprising a long portion and a short portion perpendicular to the long portion, wherein the long portion is configured to allow the first orthodontic elastic member to enter the notch, and the short portion is configured to hold the first orthodontic elastic member in the notch.

4. The orthodontic correction device as claimed in claim 2, further comprising a plurality of first orthodontic elastic members, and each notch of the pair of notches is F-shaped, comprising a long portion and two short portions perpendicular to the long portion, wherein the long portion is configured to allow the first orthodontic elastic members to enter the notch, and the short portions are configured to hold the first orthodontic elastic members in the notch.

5. The orthodontic correction device as claimed in claim 1, wherein when the shell is worn on the dental arch, one teeth receiving cavity of the plurality of teeth receiving cavities that corresponds to the first elastic member holding feature has a shape providing a space to allow the first orthodontic elastic member to fit in the space and engage with the undercut region of the tooth.

6. The orthodontic correction device as claimed in claim 1, wherein the teeth receiving cavities comprise at least one first teeth receiving cavity and a plurality of second teeth receiving cavities, the at least one first teeth receiving cavity is configured to receive the at least one first tooth of the dental arch that requires correction, the second teeth receiving cavities are configured to receive a plurality of second teeth of the dental arch that do not require correction, wherein the first teeth receiving cavity has a shape allowing the at least one first tooth of the dental arch that requires correction to move to its target correction position, and the second teeth receiving cavities has shapes fitting the second teeth.

7. The orthodontic correction device as claimed in claim 1, wherein the at least one opening comprises a pair of openings is formed at a distal end of the shell to allow the second orthodontic elastic member to pass through and enter the interior of the shell, thereby exerting an elastic corrective force on at least one first tooth of the dental arch that requires correction.

8. The orthodontic correction device as claimed in claim 7, wherein the pair of opening is formed to correspond to an undercut region of the at least one first tooth.

9. The orthodontic correction device as claimed in claim 1, wherein the at least one opening comprises a pair of openings is formed on a buccal side and a lingual side of the shell to allow the second orthodontic elastic member to pass through and enter the interior of the shell, thereby exerting an elastic corrective force on at least one first tooth of the dental arch that requires correction.

10. The orthodontic correction device as claimed in claim 1, wherein the shell further forms a second elastic member holding feature corresponding to the at least one first tooth of the dental arch that requires correction, and the second orthodontic elastic member is coupled to the second elastic member holding feature and extending to the interior of the shell to exert an elastic corrective force on the at least one first tooth of the dental arch that requires correction.

\* \* \* \* \*